US011322978B2

(12) United States Patent
Kim et al.

(10) Patent No.: US 11,322,978 B2
(45) Date of Patent: May 3, 2022

(54) RECONFIGURABLE HETEROGENEOUS ENERGY HARVESTER FOR SWIPT RECEIVER AND METHOD OF ENERGY HARVESTER RECONFIGURATION

(71) Applicant: RESEARCH & BUSINESS FOUNDATION SUNGKYUNKWAN UNIVERSITY, Suwon-si (KR)

(72) Inventors: Dong In Kim, Seongnam-si (KR); Jong Ho Moon, Busan (KR); Jong Jin Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 64 days.

(21) Appl. No.: 17/060,450

(22) Filed: Oct. 1, 2020

(65) Prior Publication Data

US 2021/0126488 A1 Apr. 29, 2021

(30) Foreign Application Priority Data

Oct. 23, 2019 (KR) .................. 10-2019-0132445

(51) Int. Cl.
  *H01F 27/42* (2006.01)
  *H01F 37/00* (2006.01)
  (Continued)

(52) U.S. Cl.
  CPC ............ *H02J 50/001* (2020.01); *H02J 50/20* (2016.02); *H04L 41/0813* (2013.01)

(58) Field of Classification Search
  CPC . H02J 5/005; H02J 7/025; H02J 17/00; H01F 38/14; B60L 11/182
  (Continued)

(56) References Cited

U.S. PATENT DOCUMENTS

2018/0034279 A1* 2/2018 Frenila ................. H02J 50/00
2019/0097802 A1* 3/2019 Rowe .................. H04L 9/3213
(Continued)

FOREIGN PATENT DOCUMENTS

KR 10-2011-0009226 A 1/2011
KR 10-2012-0132235 A 12/2012
(Continued)

OTHER PUBLICATIONS

Korean Office action dated Dec. 16, 2020 in counterpart Korean Patent Application No. 10-2019-0132445 (4 pages in Korean).
(Continued)

*Primary Examiner* — Quan Tra
(74) *Attorney, Agent, or Firm* — NSIP Law (57) ABSTRACT

A method of energy harvester reconfiguration for a simultaneous wireless information and power transfer (SWIPT) receiver including receiving an input power from an RF signal, determining whether a Nblock-th energy block is activated based on a condition for operating the Nblock-th energy block having a maximum valid input power, among Nblock energy blocks each having a predetermined valid input power, in response to the Nblock-th energy block being determined activated, determining a number of energy harvesting circuits that are activated, among a plurality of energy harvesting circuits included in the Nblock-th energy block, based on power conversion efficiency, and reconfiguring power input in the Nblock-th energy block and the plurality of energy harvesting circuits included in the Nblock-th energy block, based on the determination and result of determination.

14 Claims, 7 Drawing Sheets

(51) Int. Cl.
    *H01F 38/00*     (2006.01)
    *H02J 50/00*     (2016.01)
    *H02J 50/20*     (2016.01)
    *H04L 41/0813*     (2022.01)

(58) Field of Classification Search
    USPC .......................................................... 307/104
    See application file for complete search history.

(56) References Cited

U.S. PATENT DOCUMENTS

2019/0363427 A1* 11/2019 Rahmat-Samii ....... H01Q 5/385
2020/0259423 A1* 8/2020 Ohno ..................... H02M 5/06

FOREIGN PATENT DOCUMENTS

| KR | 10-2018-0105445 A | 9/2018 |
| KR | 10-2019-0056998 A | 5/2019 |

OTHER PUBLICATIONS

Korean Office Action dated Apr. 16, 2021 in counterpart Korean Patent Application No. 10-2019-0132445 (2 pages in Korean).

\* cited by examiner

RECONFIGURABLE HETEROGENEOUS ENERGY HARVESTER FOR SWIPT RECEIVER AND METHOD OF ENERGY HARVESTER RECONFIGURATION

CROSS-REFERENCE TO RELATED APPLICATIONS

This application claims the benefit under 35 USC 119(a) of Korean Patent Application No. 10-2019-0132445 filed on Oct. 23, 2019, in the Korean Intellectual Property Office, the entire disclosure of which is incorporated herein by reference for all purposes.

BACKGROUND

1. Field

The present disclosure relates to a reconfigurable heterogeneous energy harvester for a simultaneous wireless information and power transfer (SWIPT) receiver and a method of energy harvester reconfiguration.

2. Description of Related Art

RF energy harvesting technology collectively refers to a method of obtaining energy by using the surrounding environment. Generally, the RF energy harvesting technology receives RF signal wirelessly from the RF signal transmitter, such as base station for communication, and converts and uses the received RF signal as an energy source in a receiver.

In the RF energy harvesting technology, a simultaneous wireless information and power transmission (SWIPT) technology of which a receiver receives an RF signal used for data communication and simultaneously performs information decoding and energy harvesting has an advantage of not requiring additional resource allocation for the energy harvesting.

However, the energy harvesting circuit included in the SWIPT receiver has a nonlinear device characteristics, and the range having excellent power conversion efficiency (PCE) is limited; thus, various studies to improve the power conversion efficiency is underway.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of energy harvester reconfiguration for a simultaneous wireless information and power transfer (SWIPT) receiver including receiving an input power from an RF signal, determining whether a Nblock-th energy block is activated based on a condition for operating the Nblock-th energy block having a maximum valid input power, among Nblock energy blocks each having a predetermined valid input power, in response to the Nblock-th energy block being determined activated, determining a number of energy harvesting circuits that are activated, among a plurality of energy harvesting circuits included in the Nblock-th energy block, based on power conversion efficiency, and reconfiguring power input in the Nblock-th energy block and the plurality of energy harvesting circuits included in the Nblock-th energy block, based on the determination and result of determination.

The valid input power may be a range between a minimum value of the input power and a saturation level of the input power.

The method may further include, in response to the Nblock-th energy block determined not being activated, determining whether another energy block having lower valid input power than that of the Nblock-th energy block is activated.

The Nblock-th energy block may be determined activated when power collected for the activated Nblock-th energy block is more than power collected by activating all energy blocks from a first energy block to an Nblock-1-th energy block.

The determining of the number of energy harvesting circuit may occur, in response to the number of energy harvesting circuits currently activated in the Nblock-th energy block being $\hat{N}_{N_{block}}$, by determining that the number of energy harvesting circuits activated in the Nblock-th energy block is $\hat{N}_{N_{block}}+1$ in response to a collected power when $\hat{N}_{N_{block}}+1$ harvesting circuits are further activated being more than a sum of collected power from a first energy block to a Nblock-1-th energy block and collected power of the $\hat{N}_{N_{block}}$ energy harvesting circuits of the Nblock-th energy block.

A ratio ($\rho N_{block}$) of the input power of the Nblock-th energy block in the energy harvester may vary in accordance with the power input in the energy harvester and the number of activated energy harvesting circuits among the energy harvesting circuits included in the Nblock-th energy block.

The power input in each of the energy harvesting circuits included in the Nblock-th energy block may be distributed so that a power collected from the Nblock-th energy block is maximized.

In another general aspect, an energy harvester for a SWIPT receiver, the energy harvester includes Nblock energy blocks each having a predetermined valid input power, an energy storage unit configured to receive and store energy from the Nblock energy blocks, and a control unit configured to reconfigure a power input in the Nblock energy blocks, determine whether a Nblock-th energy block is activated based on condition for operating the Nblock-th energy block having a maximum valid input power, among the Nblock energy blocks, in response to the Nblock-th energy block being determined activated, determine a number of energy harvesting circuits that are activated, among a plurality of energy harvesting circuits included in the Nblock-th energy block, based on power conversion efficiency, and reconfigure power input in the Nblock-th energy block and the plurality of energy harvesting circuits included in the Nblock-th energy block, based on the determination and result of determination.

The valid input power may be a range between a minimum value of the input power and a saturation level of the input power.

In response to the Nblock-th energy block determined not being activated, the control unit may further determine whether another energy block having lower valid input power than that of the Nblock-th energy block is activated.

The Nblock energy block determined activated when power collected for the activated Nblock energy block may be more than power collected by activating all energy blocks from a first energy block to a Nblock-1-th energy block.

The determining of the number of energy harvesting circuit may occur, in response to the number of energy harvesting circuits currently activated in the Nblock-th energy block being $\hat{N}_{N_{block}}$, by determining that the number of energy harvesting circuits activated in the Nblock-th energy block is $\hat{N}_{N_{block}}+1$, in response to a collected power, when $\hat{N}_{N_{block}}+1$ harvesting circuit is further activated, being more than a sum of collected power from the first energy block to the Nblock-1-th energy block and collected power of the $\hat{N}_{N_{block}}$ energy harvesting circuits of the Nblock-th energy block.

A ratio ($\rho N_{block}$) of the input power of the Nblock-th energy block in the energy harvester may vary in accordance with the power input in the energy harvester and the number of activated energy harvesting circuits among the energy harvesting circuits included in the Nblock-th energy block.

The power input in each of the energy harvesting circuits included in the Nblock-th energy block may be distributed so that a power collected from the Nblock-th energy block is maximized.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
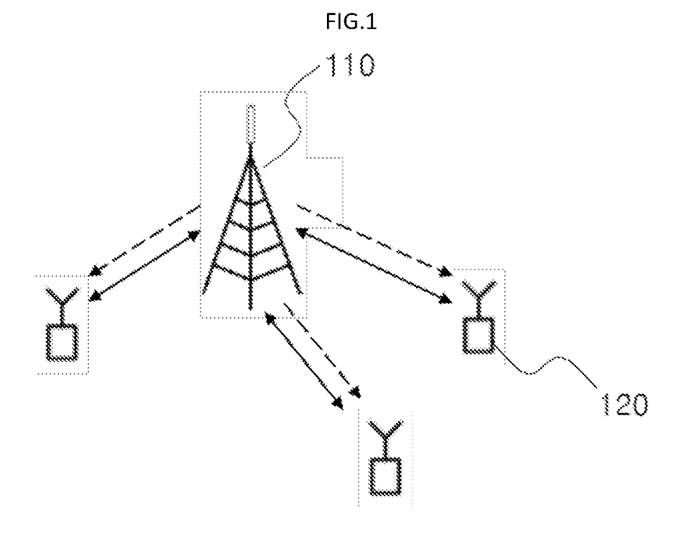
FIG. 1 is a diagram explaining an example of a SWIPT system.

FIG. 1 is a diagram illustrating an example of a SWIPT system.

In reference to FIG. 1, a terminal 120 may receive power from a battery (not shown), be supplied with electric power (dashed line) as well as radio information (solid line) from a signal received from a base station 110 to collect the energy by itself. Such a receiver collecting energy from an RF signal is defined as simultaneous wireless information and power transfer (SWIPT) receiver.

Figure 2:
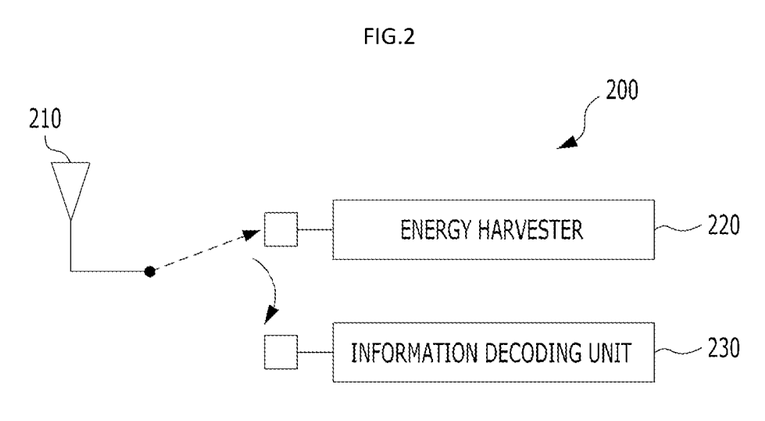
FIG. 2 is a diagram explaining an example of a SWIPT receiver.

FIG. 2 is a diagram explaining an example of a SWIPT receiver.

A SWIPT receiver 200 may include an RF antenna unit 210, an information decoding unit 230, and an energy harvester 220.

The RF antenna unit 210 may receive the RF signal, the information decoding unit 230 decodes the received RF signal to produce a received data.

The energy harvester 220 receives the input power from the RF signal to rectify the voltage and may output the rectified voltage at a desired direct current (DC) level. In addition, the energy harvester 220 is configured to receive the input power, collect the energy, and store the collected energy.

In FIG. 2, the SWIPT receiver 200 simultaneously performs the information decoding and energy harvesting, using the RF signal used for data communication. The energy harvester 220 has a nonlinear device characteristics, which may limit the availability of the input power range for energy harvesting.

Figure 3:
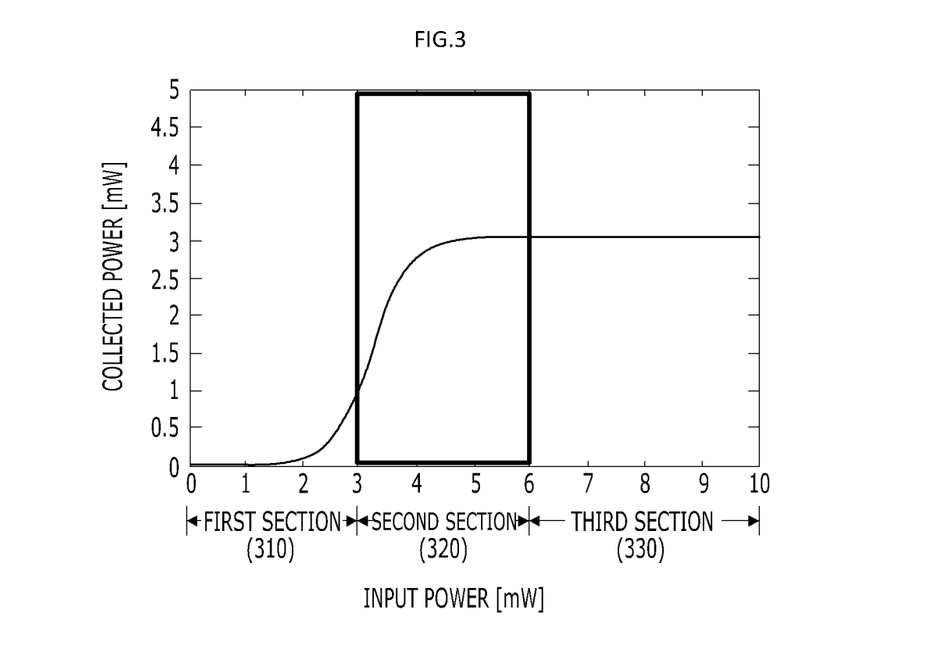
FIG. 3 is a graph illustrating an example of collected power by a SWIPT receiver including a single energy harvesting circuit in accordance with input power.
Figure 4:
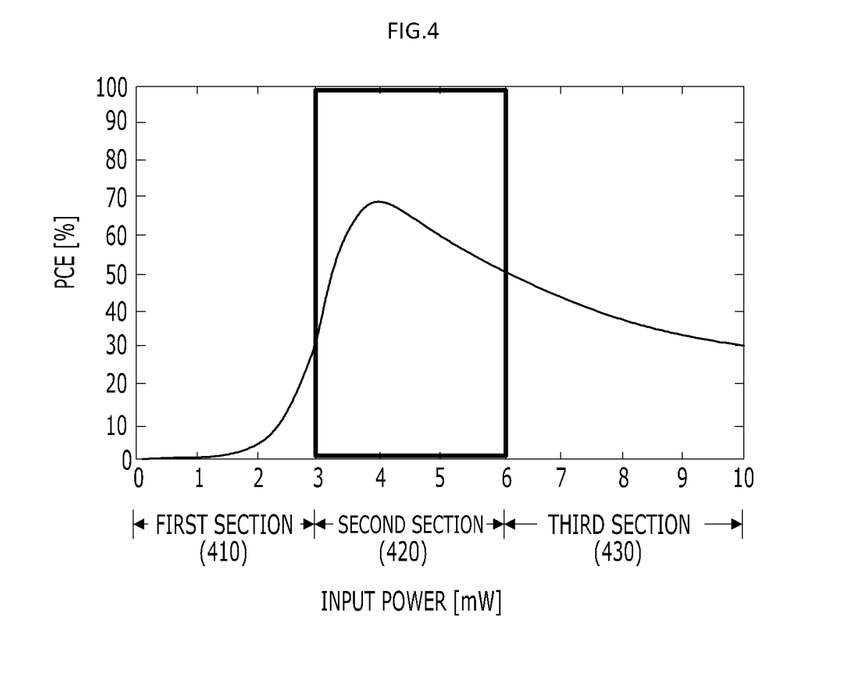
FIG. 4 is a graph diagram illustrating an example of a power conversion efficiency (PCE) of a SWIPT receiver, including a single energy harvesting circuit in accordance with input power.

FIG. 3 is a graph illustrating an example of a collected power by a SWIPT receiver, including a single energy harvesting circuit, in accordance with the input power. FIG. 4 is a graph illustrating an example of a power conversion efficiency (PCE) of a SWIPT receiver, including a single energy harvesting circuit, in accordance with the input power.

In first sections 310 and 410 of FIGS. 3 and 4 with a low input power, the energy harvesting circuit of the SWIPT receiver has difficulty operating due to the turn-on sensitivity of a diode. Therefore, it may be seen that the collected power is low in the first section 310 of FIG. 3, and power conversion efficiency is low in the first section 410 of FIG. 4.

On the other hand, in third sections 330 and 430 of FIGS. 3 and 4 with a high input power, a saturation phenomenon (saturation) where collected power stops increasing over time occurs due to the reverse breakdown voltage of the diode. Accordingly, it may be seen that the collected power stops increasing over time in the third section 330 of FIG. 3, and power conversion efficiency decreases in the third section 430 of FIG. 4. Further, when an input power higher than the reverse breakdown voltage is applied to the diode of the rectifier, a failure of the circuit may be caused; thus, inputting electric power that is too high to the energy harvesting circuit may be undesirable.

Accordingly, the SWIPT receiver is constrained to efficiently collecting energy when the input power is within second sections 320 and 420.

Figure 5:
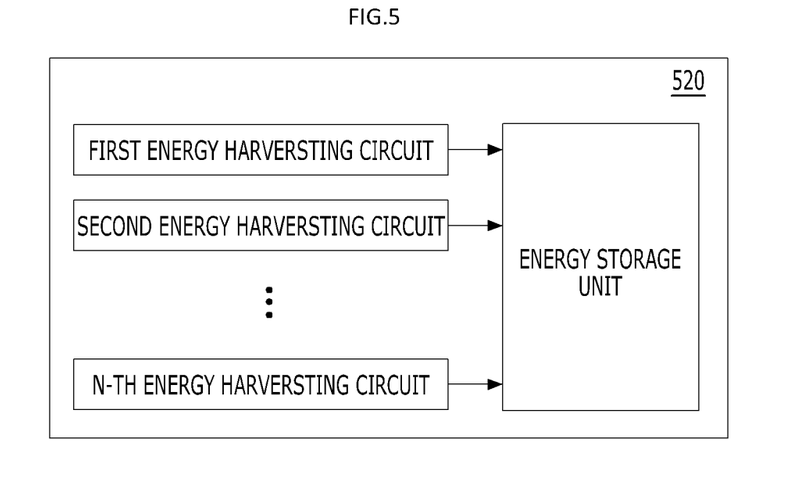
FIG. 5 is a block diagram explaining the energy harvester of a typical SWIPT receiver.

FIG. 5 is a block diagram explaining the energy harvester of a typical SWIPT receiver. Specifically, FIG. 5 shows an energy harvester, including a plurality of homogeneous energy harvesting circuits proposed to mitigate the saturation that occurs at a high input power.

In FIG. 5, the energy harvester 520 may include N homogeneous energy harvesting circuits and an energy storage unit.

Here, the energy storage unit may receive and store collected power from the energy harvesting circuit, and may include at least one of capacitor and battery. However, the type of energy storage unit is not limited.

On the other hand, the N homogeneous energy harvesting circuits illustrated in FIG. 5 is connected in parallel structure, and different input power may be distributed so that the power conversion efficiency (PCE) is maximized. In this case, since it is possible to reconfigure the energy harvesting circuit that collects energy in the energy harvester in accordance with the input power, saturation occurs at a higher input power compared to an energy harvester having a single energy harvesting circuit.

Therefore, as compared with the energy harvester having a single energy harvesting circuit used to widen the range of available input power, energy harvesting efficiency may be increased. However, in an example of the low input power, still, there is a difficulty in collecting the energy.

Figure 6:
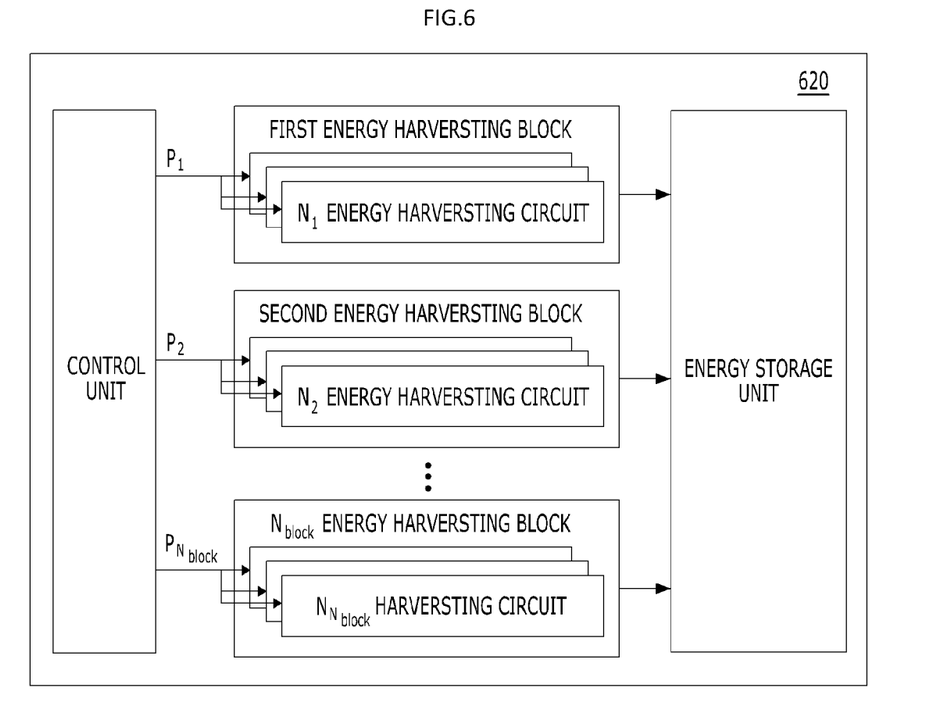
FIG. 6 is a block diagram explaining an example of the energy harvester of a SWIPT receiver.

FIG. 6 is a block diagram explaining an example of the energy harvester of a SWIPT receiver.

An energy harvester 620 for a SWIPT receiver, in one or more examples, may include Nblock energy blocks having a predetermined valid input power respectively, an energy storage unit that receives and stores the energy from the Nblock energy blocks, and a control unit that reconfigures the input power of the Nblock energy blocks. Here, the energy storage unit is the same as the energy storage unit of FIG. 5, a more detailed description thereof will be omitted.

The Nblock energy blocks included in the energy harvester 620 are heterogeneous energy blocks, including a plurality of energy harvesting circuits, respectively. The heterogeneous energy blocks refer to energy blocks having a different valid input power.

In other words, in the energy harvester 620, a valid input power of the plurality of energy harvesting circuits included in one energy block is the same, but different energy blocks will have a different valid input power.

Here, the valid input power may be defined as a section of the input power that the energy harvesting of the energy harvesting circuit is optimally performed. The heterogeneous energy block and valid input power will be described in more detail in FIG. 7.

Figure 7:
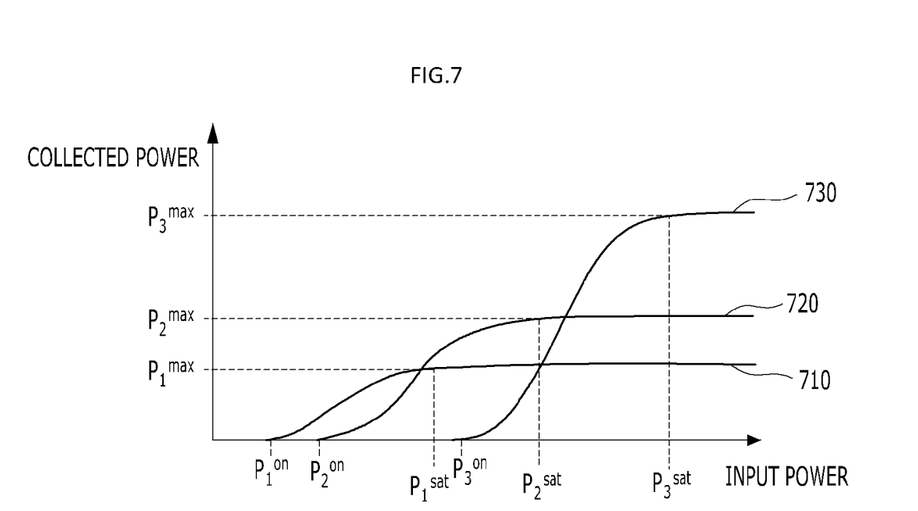
FIG. 7 is a graph illustrating an example of the collected power from the three heterogeneous energy blocks.

FIG. 7 is a graph illustrating an example of the collected power from the three heterogeneous energy blocks.

Graphs 710 to 730 of FIG. 7 depict the power that may be collected by three heterogeneous energy blocks in accordance with the input power. For example, $P_1^{on}$ is the minimum value of the input power that the first energy block may collect the energy, $P_a^{sat}$ is the input power that saturation occurs in the first energy block. And $P_1^{max}$ is the maximum power that the first energy block may collect. Here, the valid input power may be defined as the section from the minimum value of the input power that the energy may be collected to the input power that saturation occurs. In an example of the first energy block, valid input power may be expressed as $[P_1^{on}, \ldots, P_1^{sat}]$. In addition, the energy block with a relatively high range of valid input power may be defined as the energy block optimized for relatively high input power.

In FIG. 7, since the three energy blocks have different minimum values of the input power, different maximum values of the input power and collected power in which saturation occur, to each other, the three energy blocks may be included in the energy harvester as heterogeneous energy blocks.

In FIG. 6, the first energy harvesting block of Nblock energy blocks includes N1 energy harvesting circuits, the ratio of to the first energy harvesting block with respect to the input power may be expressed as ρ1. Further, Nblock-th energy block includes $N_{N_{block}}$ energy harvesting circuits. With respect to the input power, the ratio of input power to the Nblock-th energy harvesting block is represented to $\rho N_{block}$. Thus, sum of ρ1 to $\rho N_{block}$ may be up to 1.

Meanwhile, hereinafter, i-th energy block is assumed to have lower valid input power than that of the i+1-th energy block for the convenience of explanation. Under this assumption, each energy block may activate the Ni energy harvesting circuits satisfying the conditions such as Equation 1 described below.

$$\eta_i^{max} \leq \eta_{i+1}^{max}$$
$$N_i P_i^{max} \leq P_{i+1}^{max}$$
$$N_i P_i^{on} \leq P_{i+1}^{on}$$

Equation 1

Here, means $\eta_i^{max}$, $P_i^{max}$, $P_i^{on}$ maximum energy conversion efficiency (PCE) of the i-th energy block, maximum energy harvesting power, a minimum value of the input power to satisfy the turn-on sensitivity, respectively. That is, the energy block optimized for higher input power has a higher energy conversion efficiency; more energy may be collected if the input power is sufficient. However, if the input power is insufficient, energy may not be collected because of the high turn-on sensitivity.

The energy harvester 620 in one or more examples constitute a plurality of the energy blocks having various valid input power in parallel through a heterogeneous energy block structure. Therefore, it is possible to collect the energy from the energy block that has a low valid input power at low input power. Further, by configuring a plurality of energy harvesting circuits to each energy block, it is possible to mitigate the saturation region that occurs when the high power is input in the energy block.

On the other hand, the energy harvester 620 in one or more examples may reconfigure the input power to activate only a part of energy harvesting circuits included in each energy block. Specifically, the energy harvester 620 may distribute the power so that each energy block does not reach the saturation region and has a maximum collect efficiency, on the basis of the input power.

In an example where the input power is large in the energy block, it may be desired to lower the input power at each of the energy harvesting circuits in order to avoid each energy harvesting circuits from reaching the saturation region, respectively. For this, by increasing the number of energy harvesting circuits being activated, input power is controlled in each of the energy harvesting circuits. Thus, the number of energy harvesting circuits which is activated in the energy block may be proportional to the input power.

The control unit is configured to determine whether a Nblock-th energy block is activated based on the condition for operating the Nblock-th energy block having a maximum valid input power among Nblock energy blocks, when the Nblock-th energy block is determined to be activated, determine the number of energy harvesting circuits which are activated among a plurality of energy harvesting circuits included in the Nblock-th energy block based on power conversion efficiency, and reconfigure the power input in the Nblock-th energy block and the plurality of energy harvesting circuits included in the Nblock-th energy block, based on the determination and result of determination.

Here, in an example where the Nblock-th energy block is determined not to be activated, the control unit further determines whether another energy block is activated, the other energy block having lower valid input power than that of the Nblock-th energy block.

Further, determining, by the control unit, whether the Nblock-th energy block is activated is determining that the Nblock-th energy block is activated when power collected in an example where the Nblock-th energy block is activated is more than a power collected by activating all energy blocks from a first energy block to Nblock-1-th energy block.

Further, determining, by the control unit, the number of energy harvesting circuit which is activated among the plurality of energy harvesting circuits included in the Nblock-th energy block is, when the number of energy harvesting circuits currently activated in the Nblock-th energy block is $\hat{N}_{N_{block}}$, determining that the number of energy harvesting circuits activated in the Nblock-th energy block as $\hat{N}_{N_{block}}+1$, in an example where a collected power when $\hat{N}_{N_{block}}+1$ harvesting circuits are further activated is more than a sum of collected power from the first energy block to the Nblock-1-th energy block and collected power of the $\hat{N}_{N_{block}}$ energy harvesting circuits of the Nblock-th energy block.

On the other hand, the energy harvester 620 in one or more examples may distribute the input power differently to the heterogeneous energy block in accordance with the received power (Pr), and reconfigure the energy harvesting circuit included in the energy block. Here, for the optimal energy harvesting, reconfiguration of the energy block and energy harvesting circuit may be expressed as Equation 2 described below.

$$(P1): \max_{\rho,\omega,\hat{N}} \sum_{i=1}^{N_{EH}} \left( \sum_{j=1}^{\hat{N}_i} Q_i(\omega_i^j \rho_i P_r) \right)$$

Equation 2

$$\text{s.t.} \sum_{i=1}^{N_{EH}} \rho_i = 1, \sum_{j=1}^{\hat{N}_i} \omega_i^j = 1,$$

$$\rho_i, \omega_i^j \geq 0, \forall i, j$$

Where ρi represents the input power ratio to the i-th energy block to the power that is received from the energy harvester 620, $\omega_i^j$ represents the input power ratio to the j-th energy harvesting circuit included in the i-th energy block. Further, $$\sum_{j=1}^{\hat{N}_i} Q_i(\omega_i^j \rho_i x)$$

means the sum of the collected power through $\hat{N}_i$ circuits ($\hat{N}_i \in \{1, 2, \ldots, N_i\}$) in the i-th energy block.

In order to collect the energy to a maximum, a ratio of input power distributed to each energy block, the number of energy harvesting circuits to be activated among the energy harvesting circuits included in each energy block, and the power input each energy harvesting circuit may be optimized.

Since an energy block optimized for high input power has a high turn-on sensitivity, the energy harvesting efficiency is considerably reduced unless enough power is input, but the energy harvesting efficiency is improved if enough power is input. Therefore, when the input power is enough, an energy block optimized for relatively high input power is activated to collect optimum energy. Otherwise, an energy block optimized for relatively low input power may be activated to collect optimum energy.

Figure 8:
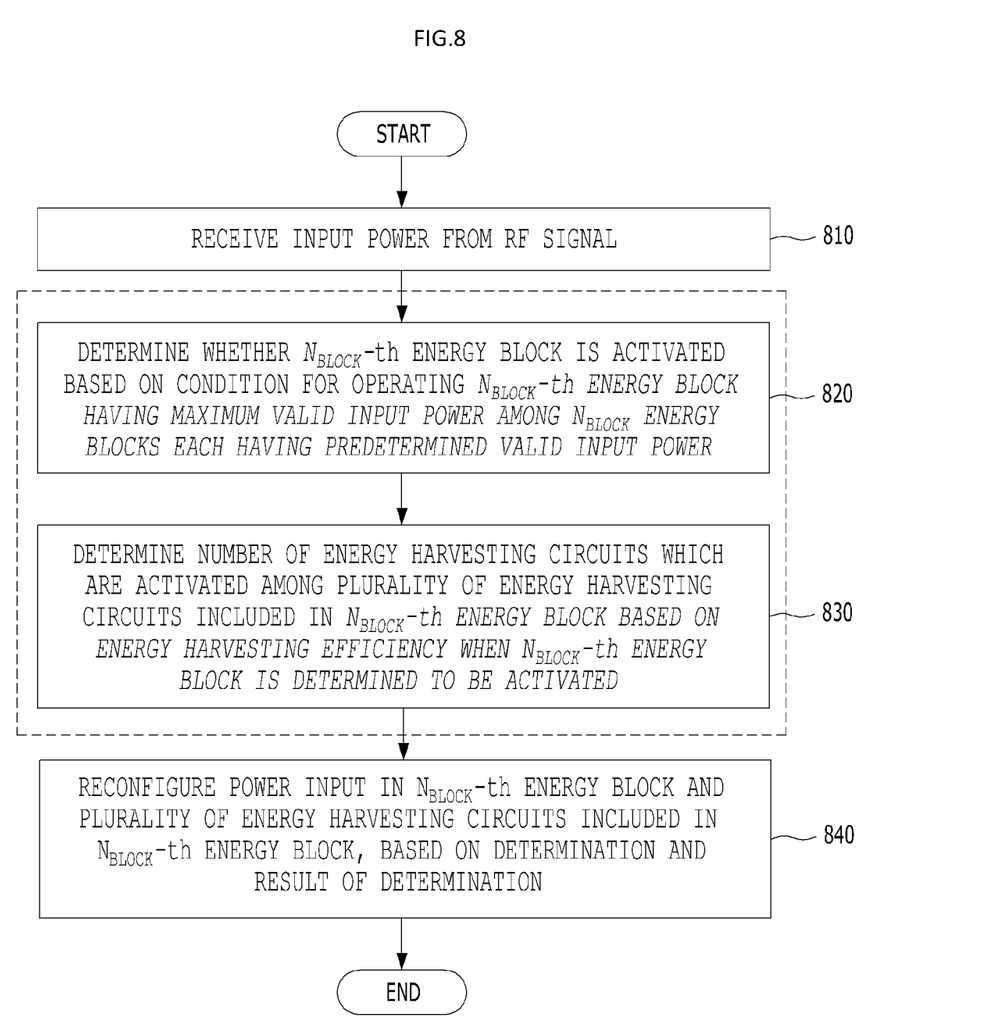
FIG. 8 is a flowchart illustrating an example of a method of reconfiguration of energy harvester for the SWIPT receiver.

FIG. 8 is a flowchart illustrating an example of a method of reconfiguration of energy harvester for SWIPT receiver.

In operation 810, the input power may be received from the RF signal by the energy harvester.

In operation 820, the energy harvester may determine whether a Nblock-th energy block is activated and available based on the condition for operating the Nblock-th energy block having a maximum valid input power, among Nblock energy blocks each having a predetermined valid input power.

Further, operation 820 is an operation of determining that the Nblock-th energy block is activated when a power collected in an example where the Nblock-th energy block is activated is more than a power collected by activating all energy blocks from a first energy block to Nblock-1-th energy block.

The conditions for operating the Nblock-th energy block optimized for high input power according to an embodiment may be expressed as Equation 3.

$$(C1): Q_{N_{block}}(P_{in}) > \max \sum_{i=1}^{N_{block}-1} \left( \sum_{j=1}^{N_i} Q_i(\omega_i^j \rho_i P_{in}) \right) = \sum_{i=1}^{N_{block}-1} N_i P_i^{max} \quad \text{Equation 3}$$

Where $$\sum_{j=1}^{N_i} Q_i(\omega_i^j \rho_i P_{in})$$

means collected power in the i-th energy block, and maximum collected power of i-th energy block is $N_i P_i^{max}$. In order to operate the energy block optimized for high input power, $P_{in} > P_{N_{block}}^{active}$ needs to be satisfied, here, $P_{n_{block}}^{active}$ is the minimum value (threshold value) of the input power that satisfies the above operating conditions (C1). In other words, when the electric power of $P_{N_{block}}^{active}$ is input, the collected power may be expressed as in Equation 4.

$$Q_{N_{block}}(P_{N_{block}}^{active}) = \sum_{i=1}^{N_{block}-1} N_i P_i^{max} \quad \text{Equation 4}$$

In an example where the Nblock-th energy block is determined not to be activated, the method of energy harvester reconfiguration according to an embodiment may further include determining whether another energy block is activated, the other energy block having lower valid input power than that of the Nblock-th energy block.

In operation 830, when the Nblock-th energy block is determined to be activated, the number of energy harvesting circuits that are activated, among a plurality of energy harvesting circuits included in the Nblock-th energy block, may be determined based on power conversion efficiency.

Further, operation 830 may include, when the number of energy harvesting circuits currently activated in the Nblock-th energy block is $\hat{N}_{N_{block}}$, determining that the number of energy harvesting circuits activated in the Nblock-th energy block as $\hat{N}_{N_{block}}+1$, in an example where a collected power when $\hat{N}_{N_{block}}+1$ harvesting circuits are further activated is more than a sum of collected power from the first energy block to the Nblock-1-th energy block and collected power of the $\hat{N}_{N_{block}}$ energy harvesting circuits of the Nblock-th energy block.

A condition for further reconfiguring number of the energy harvesting circuit according to an embodiment from $\hat{N}_{N_{block}}$ to $\hat{N}_{N_{block}}+1$ may be expressed as shown in Equation 5.

$$(C2): \hat{N}_{N_{block}} P_{N_{block}}^{max} + \sum_{i=1}^{N_{block}-1} N_i P_i^{max} < \sum_{i=1}^{\hat{N}_{N_{block}}+1} Q_{N_{block}}(\omega^j P_{in}) \quad \text{Equation 5}$$

In other words, $P_{in} > P_{N_{block}}^{th}$ needs to be satisfied in order to increase the number of energy harvesting circuits activated in the Nblock-th energy block $\hat{N}_{N_{block}}$ to $\hat{N}_{N_{block}}+1$. Here, $P_{N_{block}}^{th}$ is a minimum value (threshold value) of the input power that satisfies the condition (C2) of Equation 5, and may be expressed by the function of the number of currently activated energy harvesting circuit ($\hat{N}_{N_{block}}$). If the number of the activated energy harvesting circuit is increased even though the above condition is not satisfied, energy harvesting efficiency may rather be reduced, keep the number of activated energy harvesting circuit in such cases.

Meanwhile, when the electric power of $P_{N_{block}}^{th}$ block is input, the collected power may be expressed as Equation 6.

$$\hat{N}_{N_{block}} P_{N_{block}}^{max} + \sum_{i=1}^{N_{block}-1} N_i P_i^{max} = \sum_{j=1}^{\hat{N}_{N_{block}}+1} Q_{N_{block}}(\omega^j P_{N_{block}}^{th}) \quad \text{Equation 6}$$

In operation 840, the power input may be reconfigured in the Nblock-th energy block and the plurality of energy harvesting circuits included in the Nblock-th energy block, based on the determination and result of the determination.

Here, the power input in each of the energy harvesting circuits included in the Nblock-th energy block is distributed so that power collected from the Nblock-th energy block is maximized.

When each energy block and the energy harvesting circuits are reconfigured according to Equation 3 and Equation 5, a power ratio $$\left( \omega = [\omega^1, \omega^2, \cdots, \omega^{\hat{N}_{N_{block}}}] \right)$$

input in the energy harvesting circuit included in the Nblock-th energy block may be expressed as Equation 7.

$$\omega = \operatorname{argmax}_\omega \sum_{j=1}^{\hat{N}_{N_{block}}} Q_{N_{block}}(\omega^j P_{in}) \quad \text{Equation 7}$$

Furthermore, the ratio ($\rho_{N_{block}}$) of the input power of the Nblock-th energy block for the input power input in the SWIPT receiver may vary depending on the power input in the energy harvester and the number of the activated energy harvesting circuit among the energy harvesting circuits included in the Nblock-th energy block.

When the number ($\hat{N}_{N_{block}}$) of activated energy harvesting circuit in Nblock-th energy block and input power ratio ($\omega_{N_{block}}$) of activated energy harvesting circuit are determined through the Equation 6 and the Equation 7, the input power ratio ($\rho_{N_{block}}$) of the Nblock-th energy block may be expressed by Equation 8.

$$\rho_{N_{block}} = \min(1, \hat{N}_{N_{block}} P_{N_{block}}^{sat}/P_{in}), \rho_1 = 1 - \sum_{i=2}^{N_{block}} \rho_i \quad \text{Equation 8}$$

In a method of reconfiguration of energy harvester according to an embodiment, whether to activate a Nblock-1-th energy block to the first energy block and whether to activate $\hat{N}_{N_{block}}-1$, $\hat{N}_{N_{block}}-2, \ldots, \hat{N}_1$ energy harvesting circuits included in the energy block to be activated may be determined by using a method similar to Equation 3 to Equation 8.

Figure 9:
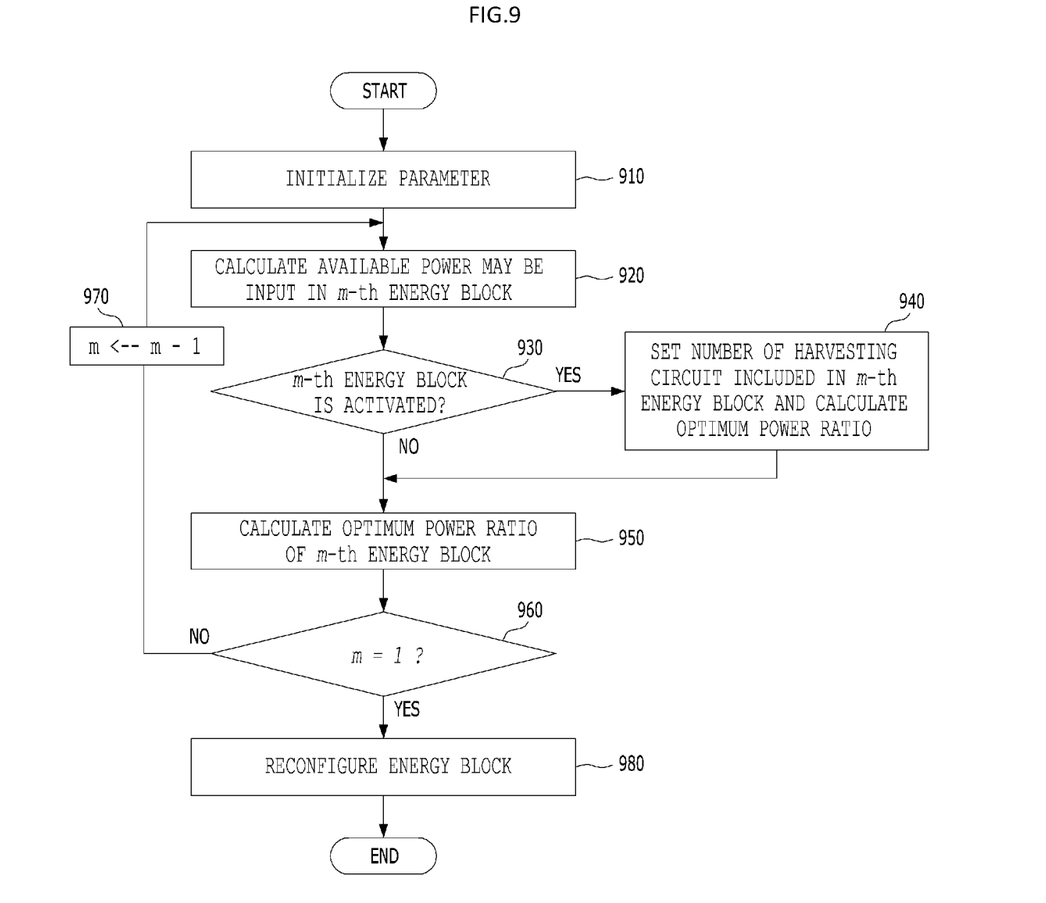
FIG. 9 is a flowchart illustrating another example of a method of reconfiguration of energy harvester for a SWIPT receiver.

FIG. 9 is a flowchart illustrating another example of a method of reconfiguration of energy harvester for a SWIPT receiver.

In operation 910, a parameter may be initialized by the energy harvester. At this time, the parameters to be initialized may include the power ratio ($\rho$) of energy block, the power ratio of energy harvesting circuit in each energy block (wi, where $\forall i \in \{1, \ldots, N_{block}\}$), and the number of the activated energy harvesting circuit ($\hat{N}_t$). In addition, the variable m may be initialized with the number of energy blocks (Nblock) included in the energy harvester.

In operation 920, it is possible to calculate available power that may be input in the m-th energy block (Pin) by the energy harvester. For example, when the power input to the energy harvester is Pr and the variable m is Nblock, the power (Pin) that may be input in the Nblock-th energy block may be the power itself (Pr) input in the energy harvester. If the variable m is not a Nblock, the available power (Pin) that may be input in the m-th energy block is $(1-\rho_{i=m+1}^{N_{block}}\rho_i)P_r$.

In operation 930, it is possible to determine whether the m-th energy block is activated by the energy harvester. If it is determined that the m-th energy block is activated, operation 940 is performed; otherwise, operation 950 may be performed. Here, the activation of the m-th energy block may be determined through Equation 9 described below.

$$\hat{N}_m P_m^{max} + \Sigma_{i=1}^{m-1} N_i P_i^{max} < \Sigma_{j=1}^{N_m+1} Q_m(w_m^j P_{in}) \quad \text{Equation 9:}$$

In operation 940, it is possible to set the number of energy harvesting circuit included in the m-th energy block by the energy harvester to calculate the optimum power ratio. Specifically, when the power input in each energy harvesting circuit included in the m-th energy block is expressed as vector value ($w^*_m$), $w^*_m$ may be derived through Equation 10 below.

$$w^*_m = \text{argmax}_w \Sigma_{j=1}^{\hat{N}_m} Q_m(w_m^j P_{in}) \quad \text{Equation 10:}$$

In operation 950, it is possible to calculate the optimum power ratio of the m-th energy block by the energy harvester. In particular, the power ratio ($\rho m$) of the m-th energy block for the total input power may be calculated through Equation 11 described below.

$$\rho_m = \begin{cases} \min\left(1 - \sum_{i=m+1}^{N_{block}} \rho_i, \hat{N}_m P_m^{sat}/P_{in}\right) & m \neq 1 \\ 1 - \sum_{i=2}^{N_{block}} \rho_i & m = 1 \end{cases} \quad \text{Equation 11}$$

In operation 960, it may be determined whether the variable m is equal to 1 by the energy harvester. If the variable m is equal to 1, it means input power distribution for all the energy blocks included in the energy harvester is complete. Thus, if the variable m is equal to 1, operation 980 is performed; otherwise, operation 970 may be performed.

In operation 970, the variable m decreases by 1 by the energy harvester.

In operation 980, it is possible to reconfigure the input power for the energy block and each energy harvesting circuits included in the energy block by the energy harvester.

Figure 10:
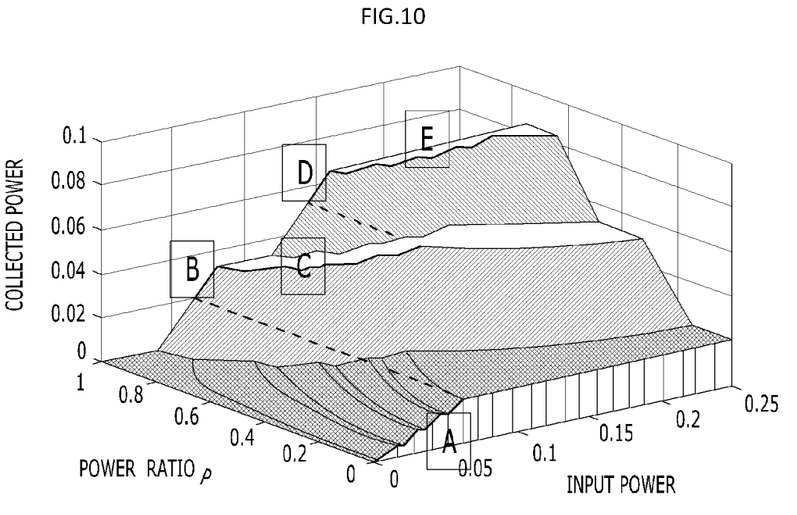
FIG. 10 is a diagram illustrating an example of the experimental results about the energy harvester.

FIG. 10 is a diagram illustrating an example of the experimental results about the energy harvester.

The energy harvester used in the experiment of FIG. 10 includes two energy blocks (Nblock=2) different from each other. The number of the energy harvesting circuits included in the first energy block is 4 (NL=4), the first energy block having lower valid input power, and the number of the energy harvesting circuits included in the second energy block is 2 (NH=2), the second energy block having higher valid input power.

A power ratio ($\rho$) in FIG. 10 may be an arbitral number between 0 and 1. An example in which the power ratio ($\rho$) is zero denotes using only the first energy block that has a lower valid input power, and an example in which the power ratio ($\rho$) is 1 denotes using only the second energy block that has a higher valid input power.

Section A of FIG. 10 shows an example where the power ratio ($\rho$) is zero, and only the first energy block may be used when the input power is low. In section A, since the four energy harvesting circuits of the first energy block may be used, the saturation may be delayed compared to when using one energy harvesting circuit.

Section B of FIG. 10 shows an example where the power ratio ($\rho$) is 1, and only the second energy block may be used when the power that reaches the saturation even though all energy harvesting circuits included in the first energy block are used is input. In section B, the energy harvester collects energy by using only one energy harvesting circuit of the second energy block.

Section C of FIG. 10 shows an example where the first energy block and the second energy block are used together, since the power ratio ($\rho$) is 0.5 to 1 when having input power higher than that of the section B. In section C, the energy harvester uses one energy harvesting circuit of the second energy block and collects the energy by using at least one of four energy harvesting circuits of the first energy block in accordance with input power.

Section D of FIG. 10 shows an example of the power ratio ($\rho$) is 1 when it has a higher input power than section C, and only the second energy block is used. In section D, unlike the section B, the energy harvester collects the energy by using both two energy harvesting circuits of the second energy block.

Section E of FIG. 10 shows an example where the first energy block and the second energy block are used together, since the ratio between ($\rho$) is 0.5 to 1 when having input power higher than that of section D. In section E, unlike section C, the energy harvester uses all two energy harvesting circuits of the second energy block and collects the energy by using at least one of four energy harvesting circuits of the first energy block in accordance with the input power.

The SWIPT receiver 200, RF antenna unit 210, information decoding unit 230, and energy harvester 220, 620 in FIGS. 1-4 and 6-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 and 6-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of energy harvester reconfiguration for a simultaneous wireless information and power transfer (SWIPT) receiver, the method comprising:
receiving an input power from an RF signal;
determining whether a Nblock-th energy block is activated based on a condition for operating the Nblock-th energy block having a maximum valid input power, among Nblock energy blocks each having a predetermined valid input power;
in response to the Nblock-th energy block being determined activated, determining a number of energy harvesting circuits that are activated, among a plurality of energy harvesting circuits included in the Nblock-th energy block, based on power conversion efficiency; and
reconfiguring power input in the Nblock-th energy block and the plurality of energy harvesting circuits included in the Nblock-th energy block, based on the determination and result of determination.

2. The method of claim 1, wherein the valid input power is a range between a minimum value of the input power and a saturation level of the input power.

3. The method of claim 1, the method further comprising:
in response to the Nblock-th energy block determined not being activated,
determining whether another energy block having lower valid input power than that of the Nblock-th energy block is activated.

4. The method of claim 1, wherein
the Nblock-th energy block is determined activated when power collected for the activated Nblock-th energy block is more than power collected by activating all energy blocks from a first energy block to an Nblock-1-th energy block.

5. The method of claim 1, wherein
the determining of the number of energy harvesting circuit occurs,
in response to the number of energy harvesting circuits currently activated in the Nblock-th energy block being $\hat{N}_{N_{block}}$, by determining that the number of energy harvesting circuits activated in the Nblock-th energy block is $\hat{N}_{N_{block}}+1$ in response to a collected power when $\hat{N}_{N_{block}}+1$ harvesting circuits are further activated being more than a sum of collected power from a first energy block to a Nblock-1-th energy block and collected power of the $\hat{N}_{N_{block}}$ energy harvesting circuits of the Nblock-th energy block.

6. The method of claim 1, wherein
a ratio ($\rho N_{block}$) of the input power of the Nblock-th energy block in the energy harvester varies in accordance with the power input in the energy harvester and the number of activated energy harvesting circuits among the energy harvesting circuits included in the Nblock-th energy block.

7. The method of claim 1, wherein
the power input in each of the energy harvesting circuits included in the Nblock-th energy block is distributed so that a power collected from the Nblock-th energy block is maximized.

8. An energy harvester for a simultaneous wireless information and power transfer (SWIPT) receiver, the energy harvester comprising:
Nblock energy blocks each having a predetermined valid input power;
an energy storage unit configured to receive and store energy from the Nblock energy blocks; and
a control unit configured to reconfigure a power input in the Nblock energy blocks,
determine whether a Nblock-th energy block is activated based on condition for operating the Nblock-th energy block having a maximum valid input power, among the Nblock energy blocks,
in response to the Nblock-th energy block being determined activated, determine a number of energy harvesting circuits that are activated, among a plurality of energy harvesting circuits included in the Nblock-th energy block, based on power conversion efficiency, and
reconfigure power input in the Nblock-th energy block and the plurality of energy harvesting circuits included in the Nblock-th energy block, based on the determination and result of determination.

9. The method of claim 8, wherein the valid input power is a range between a minimum value of the input power and a saturation level of the input power.

10. The energy harvester of claim 8, wherein
in response to the Nblock-th energy block determined not being activated,
the control unit further determines whether another energy block having lower valid input power than that of the Nblock-th energy block is activated.

11. The energy harvester of claim 8, wherein
the Nblock energy block determined activated when power collected for the activated Nblock energy block is more than power collected by activating all energy blocks from a first energy block to a Nblock-1-th energy block.

12. The energy harvester of claim 8, wherein
the determining of the number of energy harvesting circuit occurs,
in response to the number of energy harvesting circuits currently activated in the Nblock-th energy block being $\hat{N}_{N_{block}}$, determining that the number of energy harvesting circuits activated in the Nblock-th energy block is $\hat{N}_{N_{block}}+1$, in response to a collected power, when $\hat{N}_{N_{block}}+1$ harvesting circuit is further activated, being more than a sum of collected power from the first energy block to the Nblock-1-th energy block and collected power of the $\hat{N}_{N_{block}}$ energy harvesting circuits of the Nblock-th energy block.

13. The energy harvester of claim 8, wherein
a ratio ($\rho N_{block}$) of the input power of the Nblock-th energy block in the energy harvester varies in accordance with the power input in the energy harvester and the number of activated energy harvesting circuits among the energy harvesting circuits included in the Nblock-th energy block.

14. The energy harvester of claim 8, wherein
the power input in each of the energy harvesting circuits included in the Nblock-th energy block is distributed so that a power collected from the Nblock-th energy block is maximized.

* * * * *